(12) United States Patent
Kato

(10) Patent No.: US 12,211,651 B2
(45) Date of Patent: Jan. 28, 2025

(54) CERAMIC ELECTRONIC COMPONENT AND MANUFACTURING METHOD OF THE SAME

(71) Applicant: TAIYO YUDEN CO., LTD., Tokyo (JP)

(72) Inventor: Yoichi Kato, Takasaki (JP)

(73) Assignee: TAIYO YUDEN CO., LTD, Tokyo (JP)

( * ) Notice: Subject to any disclaimer, the term of this patent is extended or adjusted under 35 U.S.C. 154(b) by 127 days.

(21) Appl. No.: 17/691,887

(22) Filed: Mar. 10, 2022

(65) Prior Publication Data

US 2022/0319775 A1 Oct. 6, 2022

(30) Foreign Application Priority Data

Mar. 30, 2021 (JP) ................................ 2021-058238

(51) Int. Cl.
*H01G 4/12* (2006.01)
*H01G 4/008* (2006.01)
*H01G 4/30* (2006.01)

(52) U.S. Cl.
CPC ........... *H01G 4/1227* (2013.01); *H01G 4/008* (2013.01); *H01G 4/30* (2013.01)

(58) Field of Classification Search
CPC ........ H01G 4/1227; H01G 4/30; H01G 4/008; H01G 4/1209; H01G 4/12; H01G 4/1236; H01G 4/012
USPC ..... 361/301.4, 321.1, 321.5, 311, 312, 321.4
See application file for complete search history.

(56) References Cited

U.S. PATENT DOCUMENTS

| 2004/0256603 | A1 | 12/2004 | Celik et al. |
| 2010/0195266 | A1* | 8/2010 | Morita ..................... H01G 4/30 501/137 |
| 2015/0155098 | A1 | 6/2015 | Yamaguchi et al. |
| 2017/0169952 | A1* | 6/2017 | Kato .................... H01G 4/2325 |
| 2018/0286586 | A1* | 10/2018 | Jung ..................... C04B 35/495 |
| 2020/0411248 | A1* | 12/2020 | Hashimoto ............ H01G 4/012 |
| 2021/0074479 | A1* | 3/2021 | Lee .......................... H01G 4/30 |

FOREIGN PATENT DOCUMENTS

| JP | 2005505695 A | 2/2005 |
| WO | 2014024538 A1 | 2/2014 |

* cited by examiner

*Primary Examiner* — Arun Ramaswamy
(74) *Attorney, Agent, or Firm* — Law Office of Katsuhiro Arai

(57) ABSTRACT

A ceramic electronic component includes a multilayer structure having a substantially rectangular parallelepiped shape and including dielectric layers and internal electrode layers that are alternately stacked, the dielectric layers being mainly composed of ceramic, the internal electrode layers being formed so as to be alternately exposed to two edge faces opposite to each other of the multilayer structure, and cover layers respectively disposed on top and bottom faces of the multilayer structure in a stack direction, the cover layers being mainly composed of ceramic, wherein at least one of a Sn concentration with respect to a main component ceramic in the cover layer or a Sn concentration with respect to a main component ceramic in a side margin section is higher than a Sn concentration with respect to a main component ceramic in a capacity section.

9 Claims, 8 Drawing Sheets

CERAMIC ELECTRONIC COMPONENT AND MANUFACTURING METHOD OF THE SAME

CROSS-REFERENCE TO RELATED APPLICATION

This application is based upon and claims the benefit of priority of the prior Japanese Patent Application No. 2021-058238, filed on Mar. 30, 2021, the entire contents of which are incorporated herein by reference.

FIELD

A certain aspect of the present disclosure relates to a ceramic electronic component and a manufacturing method of the same.

BACKGROUND

Multilayer ceramic electronic components such as, but not limited to, multilayer ceramic capacitors have a structure designed to have internal electrode layers stacked with dielectric layers interposed between the internal electrode layers. The ceramic electronic component can obtain a large electrostatic capacitance density due to the ferroelectric characteristics of the dielectric layer section interposed between the internal electrode layers as disclosed in, for example, International Publication No. 2014/024538 (Patent Document 1).

SUMMARY OF THE INVENTION

The metal contained in the internal electrode layer may diffuse into the main component ceramic of the dielectric layer to form a solid solution in the process of firing. When the metal contained in the internal electrode layer forms a solid solution with the main component ceramic of the dielectric layer, oxygen defects may be formed in the main component ceramic of the dielectric layer, resulting in decrease in the insulation property of the dielectric layer and decrease in the lifetime of the ceramic electronic component.

Therefore, by causing Sn to form a solid solution with the main component ceramic of the dielectric layer, the main component metal of the internal electrode layer is inhibited from forming a solid solution with the main component ceramic of the dielectric layer, which leads to the improvement in the insulation property of the dielectric layer and an increased product life.

However, Sn has effects to accelerate the sintering of the dielectric layers and accelerate the spheroidizing of the internal electrode layers. Therefore, while the addition of Sn improves the insulation property of the dielectric layer, it also causes a problem that the electrostatic capacitance decreases because of the disturbance of the multilayer structure caused by the spheroidizing of the internal electrode layers.

The present disclosure has an objective of providing a ceramic electronic component and a manufacturing method of the same that achieve both high insulation resistance and high electrostatic capacitance.

In one aspect of the present disclosure, there is provided a ceramic electronic component including: a multilayer structure having a substantially rectangular parallelepiped shape and including dielectric layers and internal electrode layers that are alternately stacked, the dielectric layers being mainly composed of ceramic, the internal electrode layers being formed so as to be alternately exposed to two edge faces opposite to each other of the multilayer structure; and cover layers respectively disposed on a top face and a bottom face of the multilayer structure in a first direction in which the dielectric layers and the internal electrode layers are alternately stacked, the cover layers being mainly composed of ceramic, wherein at least one of a Sn concentration with respect to a main component ceramic in the cover layer or a Sn concentration with respect to a main component ceramic in a side margin section is higher than a Sn concentration with respect to a main component ceramic in a capacity section, the side margin section being a section that covers edges, extending toward a corresponding side face of two side faces other than the two edge faces of the multilayer structure, of the internal electrode layers, the capacity section being a section where a set of the internal electrode layers exposed to one of the two edge faces is opposite to another set of the internal electrode layers exposed to the other of the two edge faces.

In another aspect of the present disclosure, there is provided a manufacturing method of a ceramic electronic component, the manufacturing method including: preparing a ceramic multilayer structure including a multilayer portion, side margin sheets disposed on respective side faces of the multilayer portion, and cover sheets respectively disposed on top and bottom faces of the multilayer portion, the multilayer portion including dielectric green sheets and patterns that are alternately stacked so that the patterns are alternately exposed to two edge faces opposite to each other of the multilayer portion, the dielectric green sheets containing ceramic particles, the patterns containing metal particles, the side margin sheets containing ceramic particles, the cover sheets containing ceramic particles; and firing the ceramic multilayer structure, wherein at least one of a Sn concentration with respect to a main component ceramic in the cover sheet before firing or a Sn concentration with respect to a main component ceramic in the side margin sheet before firing is higher than a Sn concentration with respect to a main component ceramic in the dielectric green sheet before firing.

In another aspect of the present disclosure, there is provided a manufacturing method of a ceramic electronic component, the manufacturing method including: disposing a first pattern containing metal particles on a dielectric green sheet containing ceramic particles and disposing a second pattern containing ceramic particles in a periphery of the first pattern to obtain a multilayer unit; and obtaining a ceramic multilayer structure in which cover sheets containing ceramic particles are respectively stacked on top and bottom faces of a multilayer portion in which a plurality of the multilayer units is stacked so that positions of the first patterns are alternately shifted, wherein at least one of a Sn concentration with respect to a main component ceramic in the cover sheet before firing or a Sn concentration with respect to a main component ceramic in the second pattern before firing is higher than a Sn concentration with respect to a main component ceramic in the dielectric green sheet before firing.

DETAILED DESCRIPTION

Hereinafter, with reference to the accompanying drawings, an embodiment will be described.

Embodiment

Figure 1:
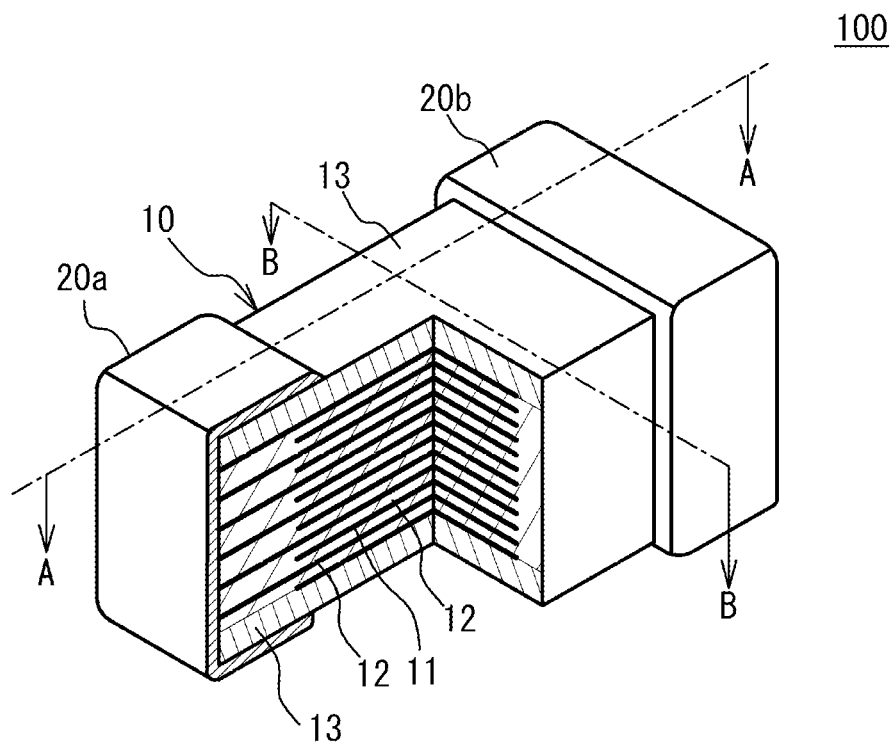
FIG. 1 is a partial cross-sectional perspective view of a multilayer ceramic capacitor.
Figure 2:
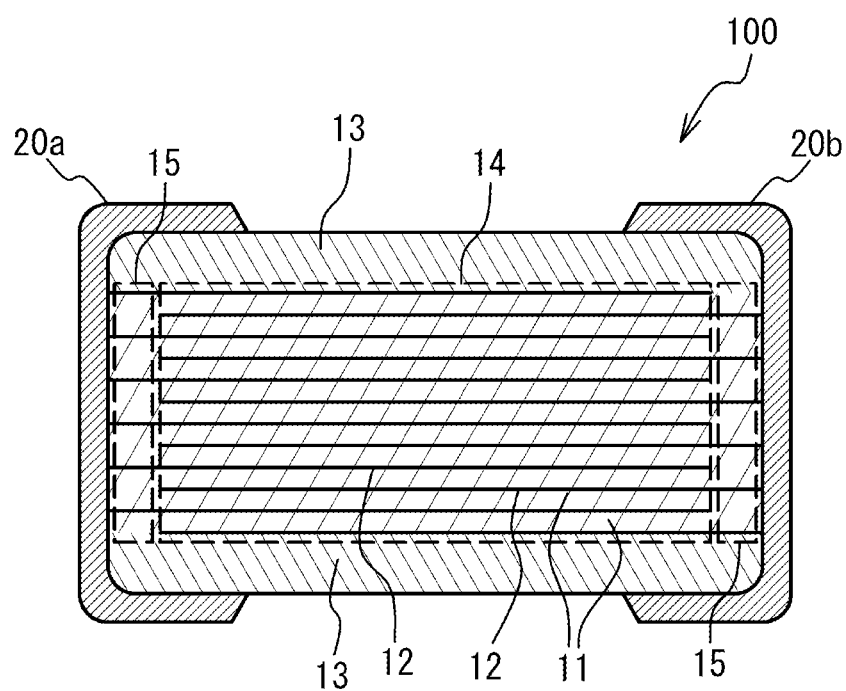
FIG. 2 is a cross-sectional view taken along line A-A in FIG. 1.
Figure 3:
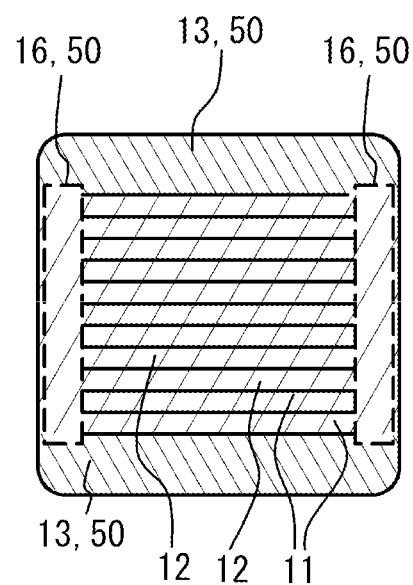
FIG. 3 is a cross-sectional view taken along line B-B in FIG. 1.

FIG. 1 is a partial cross-sectional perspective view of a multilayer ceramic capacitor 100 in accordance with an embodiment. FIG. 2 is a cross-sectional view taken along line A-A in FIG. 1. FIG. 3 is a cross-sectional view taken along line B-B in FIG. 1. As illustrated in FIG. 1 to FIG. 3, the multilayer ceramic capacitor 100 includes a multilayer chip 10 having a substantially rectangular parallelepiped shape, and external electrodes 20a and 20b respectively disposed on two edge faces opposite to each other of the multilayer chip 10. Among four faces other than the two edge faces of the multilayer chip 10, two faces other than the top face and the bottom face in the stack direction will be referred to as side faces. Each of the external electrodes 20a and 20b extends from the corresponding edge face to the top face and the bottom face in the stack direction and the two side faces of the multilayer chip 10. The external electrodes 20a and 20b are spaced from each other.

The multilayer chip 10 has a structure designed to have dielectric layers 11 and three or more internal electrode layers 12 alternately stacked. The dielectric layer 11 contains a ceramic material acting as a dielectric substance. The internal electrode layer 12 contains a base metal material. End edges of the internal electrode layers 12 are alternately exposed to a first edge face of the multilayer chip 10 and a second edge face of the multilayer chip 10 that is different from the first edge face. The external electrode 20a is disposed on the first edge face, while the external electrode 20b is disposed on the second edge face. Thus, the internal electrode layers 12 are alternately electrically connected to the external electrode 20a and the external electrode 20b. As a result, the multilayer ceramic capacitor 100 has a structure in which a plurality of the dielectric layers 11 is stacked with the internal electrode layer 12 interposed between each two of the dielectric layers 11. In the multilayer structure formed of the dielectric layers 11 and the internal electrode layers 12, the outermost layers in the stack direction are the internal electrode layers 12, and the top face and the bottom face of the multilayer body are covered by cover layers 13. A main component of the cover layer 13 is a ceramic material. For example, the main component of the cover layer 13 is the same as the main component of the ceramic material of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the dimensions of the multilayer ceramic capacitor 100 are not limited to the above dimensions.

The main component of the internal electrode layer 12 is a base metal such as nickel (Ni), copper (Cu), tin (Sn), or the like. The internal electrode layer 12 may be made of a noble metal such as platinum (Pt), palladium (Pd), silver (Ag), or gold (Au) or an alloy thereof.

The dielectric layers 11 are mainly composed of a ceramic material having a perovskite structure expressed by a general formula $ABO_3$. The perovskite structure includes $ABO_{3-\alpha}$ having an off-stoichiometric composition. For example, employed as the ceramic material is barium titanate ($BaTiO_3$), calcium zirconate ($CaZrO_3$), calcium titanate ($CaTiO_3$), strontium titanate ($SrTiO_3$), or $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. The average thickness of each of the dielectric layers 11 is, for example, 0.05 μm or greater and 5 μm or less, 0.1 μm or greater and 3 μm or less, or 0.2 μm or greater and 1 μm or less.

As illustrated in FIG. 2, the section where the internal electrode layers 12 connected to the external electrode 20a and the internal electrode layers 12 connected to the external electrode 20b are opposite to each other is a section where electric capacitance is generated in the multilayer ceramic capacitor 100. Thus, this section where electric capacitance is generated is referred to as a capacity section 14. That is, the capacity section 14 is a section where a set of the internal electrode layers 12 connected to one of the external electrodes is opposite to another set of the internal electrode layers 12 connected to the other of the external electrodes.

The section where the internal electrode layers 12 connected to the external electrode 20a are opposite to each other with no internal electrode layer 12 connected to the external electrode 20b interposed therebetween is referred to as an end margin 15. The section where the internal electrode layers 12 connected to the external electrode 20b are opposite to each other with no internal electrode layer 12 connected to the external electrode 20a interposed therebetween is also the end margin 15 That is, the end margin 15 is a section where the internal electrode layers 12 connected to one of the external electrodes are opposite to each other with no internal electrode layer 12 connected to the other of the external electrodes interposed therebetween. The end margin 15 is a section where no electric capacitance is generated.

As illustrated in FIG. 3, in the multilayer chip 10, the section from each of the two side faces of the multilayer chip 10 to the internal electrode layers 12 is referred to as a side margin 16. That is, the side margin 16 is a section that covers the edges, extending toward the corresponding side face of the multilayer structure, of the stacked internal electrode layers 12. The side margin 16 is also a section where no electric capacitance is generated. In the cross-section illustrated in FIG. 3, since the outer periphery of the capacity section 14 is covered by the cover layers 13 and the side margins 16, the cover layers 13 and the side margins 16 may be referred to as an outer peripheral section 50 in the description hereinafter.

Figure 4A:
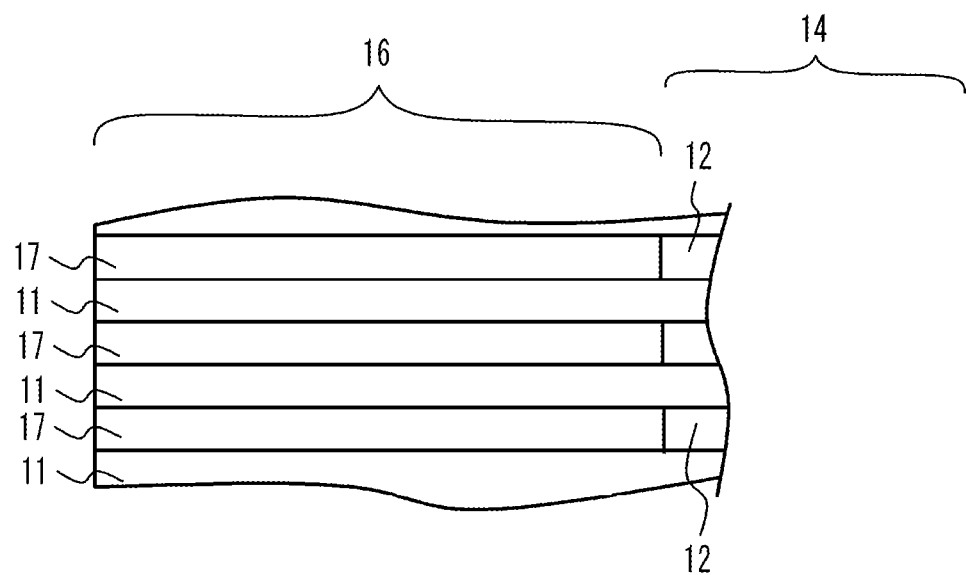
FIG. 4A is an enlarged view of the cross-section of a side margin.

FIG. 4A is an enlarged view of the cross-section of the side margin 16. The side margin 16 has a structure in which the dielectric layers 11 and inverse pattern layers 17 are alternately stacked in the direction in which the dielectric layers 11 and the internal electrode layers 12 are stacked in the capacity section 14. Each of the dielectric layers 11 in the capacity section 14 and the corresponding one of the dielectric layers 11 in the side margin 16 are continuous. This structure reduces the level difference between the capacity section 14 and the side margin 16.

Figure 4B:
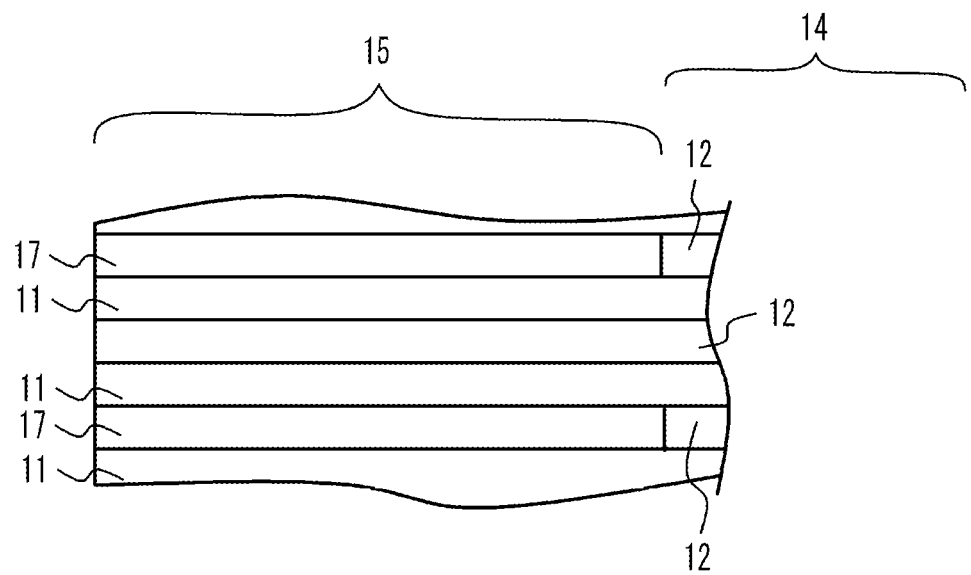
FIG. 4B is an enlarged view of the cross-section of an end margin.

FIG. 4B is an enlarged view of the cross-section of the end margin 15. In comparison with the side margin 16, in the end margin 15, every other internal electrode layer 12 of the stacked internal electrode layers 12 extends to the end face of the end margin 15. In the layer in which the internal electrode layer 12 extends to the end face of the end margin 15, no inverse pattern layer 17 is stacked. Each of the dielectric layers 11 in the capacity section 14 and the corresponding one of the dielectric layers 11 in the end margin 15 are continuous. This structure reduces the level difference between the capacity section 14 and the end margin 15.

The multilayer chip 10 is obtained by stacking layers formed of powdered material and firing them. However, the main component metal of the internal electrode layer 12 may form a solid solution with the main component ceramic of the dielectric layer 11 in the process of firing. For example, in the case that the internal electrode layer 12 contains Ni, part of Ni is oxidized in the process of firing, and ionized Ni forms a solid solution with the main component ceramic of the dielectric layer 11. When the main component metal of the internal electrode layer 12 forms a solid solution with the main component ceramic of the dielectric layer 11, oxygen defects may be formed in the main component ceramic of the dielectric layer 11, resulting in deterioration in the insulation property of the dielectric layer 11 and decrease in the lifetime of the multilayer ceramic capacitor 100.

Therefore, by causing Sn to form a solid solution with the main component ceramic of the dielectric layer 11, the main component metal of the internal electrode layer 12 is inhibited from forming a solid solution with the main component ceramic of the dielectric layer 11, and thereby, the insulation property of the dielectric layer 11 is improved, and the lifetime of the multilayer ceramic capacitor 100 is increased.

However, Sn has functions to accelerate the sintering of the dielectric layer 11 and accelerate the spheroidizing of the internal electrode layer 12. Therefore, while the addition of Sn improves the insulation property of the dielectric layer 11, it causes a problem that the electrostatic capacitance of the multilayer ceramic capacitor 100 decreases because of the disturbance of the multilayer structure caused by the spheroidizing of the internal electrode layer 12. Therefore, the multilayer ceramic capacitor 100 in accordance with the present embodiment has a structure that achieves both high insulation resistance and high electrostatic capacitance.

In the multilayer ceramic capacitor 100 in accordance with the present embodiment, each dielectric layer 11 contains Sn. For example, Sn forms a solid solution with the main component ceramic of each dielectric layer 11. This inhibits the main component metal of the internal electrode layer 12 from forming a solid solution with the main component ceramic of the dielectric layer 11 in the process of firing. As a result, the insulation property of the dielectric layer 11 is improved, and the lifetime of the multilayer ceramic capacitor 100 is increased. At least one of the Sn concentration with respect to the main component ceramic in the cover layer 13 or the Sn concentration with respect to the main component ceramic in the side margin 16 is higher than the Sn concentration with respect to the main component ceramic of each dielectric layer 11 in the capacity section 14.

In this structure, Sn diffuses from at least one of the cover layer 13 or the side margin 16 to the capacity section 14, and the Sn concentration in the vicinity of the outer periphery of the capacity section 14 becomes higher. This improves the insulation property in the vicinity of the outer periphery of the capacity section 14. The vicinity of the outer periphery of the capacity section 14 is close to the external environment, and therefore, the IR degradation and the lifetime deterioration are more likely to occur. Thus, the effect to improve the insulation property can be effectively obtained. On the other hand, the Sn concentration in the center section of the capacity section 14 becomes low, and thereby, decrease in the continuousness of the internal electrode layer 12 is reduced, which reduces decrease in electrostatic capacitance. Thus, high insulation property and high electrostatic capacitance are both achieved.

In the case that the difference between the Sn concentration in the capacity section 14 and the Sn concentration in the outer peripheral section 50 are not large enough, the diffusion of Sn into the capacity section 14 becomes insufficient, and thereby, the Sn concentration in the vicinity of the outer periphery of the capacity section 14 may become insufficiently high. Thus, the difference between the Sn concentration in the capacity section 14 and the Sn concentration in the outer peripheral section 50 preferably has a lower limit. For example, at least one of the atomic concentration ratio of Sn to B site elements (Sn/B site elements) in the cover layer 13 or the atomic concentration ratio of Sn to B site elements in the side margin 16 is preferably higher than the atomic concentration ratio of Sn to B site elements in the capacity section 14 by 0.001 or greater, more preferably higher by 0.005 or greater, further preferably higher by 0.01 or greater. The B site element is an element that occupies a B site in the perovskite structure expressed by the general expression $ABO_3$.

Too large difference between the Sn concentration in the capacity section 14 and the Sn concentration in the outer peripheral section 50 may cause inhomogeneity in sintering owing to the sintering-acceleration effect of Sn, resulting in a poor balance between the electrostatic capacitance and the dielectric loss. Thus, the difference between the Sn concentration in the capacity section 14 and the Sn concentration in the outer peripheral section 50 preferably has an upper limit. For example, the difference between the atomic concentration ratio of Sn to B site elements in the cover layer 13 and the atomic concentration ratio of Sn to B site elements in the capacity section 14 and the difference between the atomic concentration ratio of Sn to B site elements in the side margin 16 and the atomic concentration ratio of Sn to B site elements in the capacity section 14 are preferably 0.1 or less, more preferably 0.05 or less, further preferably 0.03 or less.

In the case that the Sn concentration in the outer peripheral section 50 is insufficiently large, the diffusion of Sn into the capacity section 14 may become insufficient, and the Sn concentration in the vicinity of the outer periphery of the capacity section 14 may become insufficiently high. Thus, the Sn concentration in the outer peripheral section 50 preferably has a lower limit. For example, at least one of the atomic concentration ratio of Sn to B site elements in the cover layer 13 or the atomic concentration ratio of Sn to B site elements in the side margin 16 is preferably 0.005 or greater, further preferably 0.01 or greater, more preferably 0.015 or greater.

High Sn concentration in the side margin 16 effectively improves the insulation property of the multilayer ceramic capacitor 100 because the diffusion amount of Sn into the end section of the electrode in which the concentration of the electric field is likely to occur can be effectively increased. Thus, the Sn concentration in the side margin 16 preferably has a lower limit. For example, the atomic concentration ratio of Sn to B site elements in the side margin 16 is preferably 0.01 or greater, more preferably 0.015 or greater, further preferably 0.02 or greater.

On the other hand, too large Sn concentration in the outer peripheral section 50 may cause too much acceleration of sintering of the dielectric substance in the vicinity of the outer periphery, resulting in the capacitance decrease due to the electrode discontinuity. Therefore, the Sn concentration in the outer peripheral section 50 preferably has an upper limit. For example, each of the atomic concentration ratio of Sn to B site elements in the cover layer 13 and the atomic concentration ratio of Sn to B site elements in the side margin 16 is preferably 0.1 or less, more preferably 0.05 or less, further preferably 0.03 or less.

In the case that the Sn concentration is high in the capacity section 14, the spheroidizing of the internal electrode layer 12 is not sufficiently inhibited, and the electrostatic capacitance may be decreased. Thus, the Sn concentration in the capacity section 14 preferably has an upper limit. For example, the atomic concentration ratio of Sn to B site elements in the capacity section 14 is preferably 0.01 or less, more preferably 0.0075 or less, further preferably 0.005 or less.

On the other hand, too low Sn concentration in the capacity section 14 may be less likely to sufficiently inhibit the main component metal of the internal electrode layer 12 from forming a solid solution with the dielectric layer 11. Thus, the Sn concentration in the capacity section 14 preferably has a lower limit. For example, the atomic concentration ratio of Sn to B site elements in the capacity section 14 is preferably 0.001 or greater, more preferably 0.002 or greater, further preferably 0.003 or greater.

The Sn concentration in the end margin 15 is also preferably higher than the Sn concentration in the capacity section 14. In this case, Sn diffuses from the end margin 15 to the capacity section 14, and the Sn concentration of the capacity section 14 in the vicinity of the end margin 15 becomes high. This improves the insulation property of the capacity section 14 in the vicinity of the end margin 15.

The average thickness of each internal electrode layer 12 is, for example, 0.01 μm or greater and 5 μm or less, or 0.05 μm or greater and 3 μm or less, or 0.1 μm or greater and 1 μm or less. For example, in the case that the average thickness of the internal electrode layer 12 is 1 μm or less, the continuousness is likely to decrease because of the rupture during firing. Thus, the effect of the structure in accordance with the present embodiment is remarkably produced. In the multilayer ceramic capacitor 100, the number of the internal electrode layers 12 that are stacked is, for example, 10 to 5000, 50 to 4000, or 100 to 3000.

Figure 5:
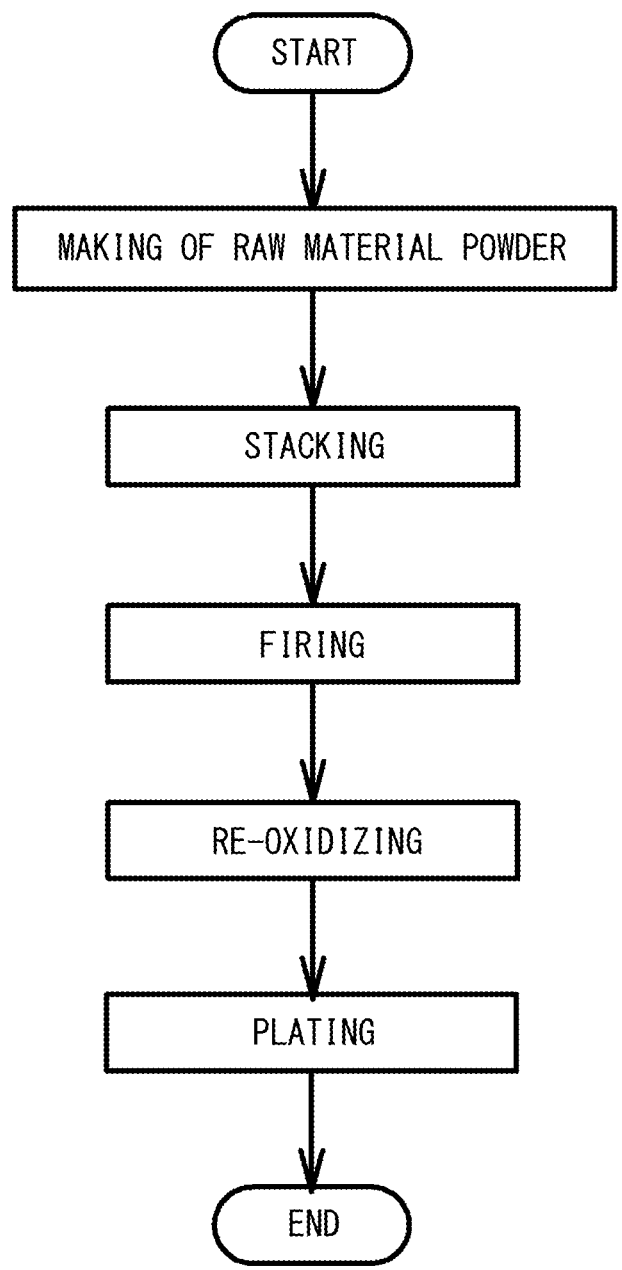
FIG. 5 is a flowchart of a method of manufacturing the multilayer ceramic capacitor.

Next, a manufacturing method of the multilayer ceramic capacitor 100 will be described. FIG. 5 is a flowchart of the manufacturing method of the multilayer ceramic capacitor 100.

Making of Raw Material Powder

The A site element and the B site element contained in the dielectric layer 11 are contained in the dielectric layer 11 typically in the form of a sintered compact of $ABO_3$ particles. For example, barium titanate is a tetragonal compound having a perovskite structure, and exhibits high permittivity. Barium titanate can be synthesized from, for example, ultrafine particles of a barium compound raw material such as barium carbonate and ultrafine particles of a titanium compound raw material such as titanium dioxide. Various methods, including the solid phase method, the sol-gel method, and the hydrothermal method, have been known as a synthesizing method. Any one of the above methods can be employed in the present embodiment. When ceramic particles other than barium titanate are synthesized, the ceramic material that is particulate and has a perovskite structure can be synthesized from the compound raw material of the A site element and the compound raw material of the B site element. Mo may be incorporated into the ceramic material to form a solid solution by substitution in advance by adding the Mo source in the process of synthesizing the ceramic material.

Additive compound is added to the resulting ceramic powder in accordance with purposes. The additive compound may be an oxide of tin (Sn), magnesium (Mg), manganese (Mn), vanadium (V), chrome (Cr), or a rare-earth element (yttrium (Y), samarium (Sm), europium (Eu), gadolinium (Gd), terbium (Tb), dysprosium (Dy), holmium (Ho), erbium (Er), thulium (Tm) or ytterbium (Yb)), or an oxide containing cobalt (Co), nickel (Ni), lithium (Li), boron (B), sodium (Na), potassium (K), or silicon (Si), or glass containing cobalt, nickel, lithium, boron, sodium, potassium, or silicon.

For example, the compounds containing the additive compound are added to the ceramic material and wet-blended, and then dried and crushed. The resulting material may be crushed to adjust the particle size as necessary, or may be crushed and classified to adjust the particle size. Through the above process, the ceramic raw powder that is to be the main component of the dielectric layer is obtained.

Stacking

Next, a binder such as polyvinyl butyral (PVB) resin, an organic solvent such as ethanol or toluene, and a plasticizer are added to the resulting ceramic raw powder and wet-blended. The resulting slurry is applied on a base material using, for example, a die coater method or a doctor blade method, and then dried to form a dielectric green sheet 51.

Figure 6A:
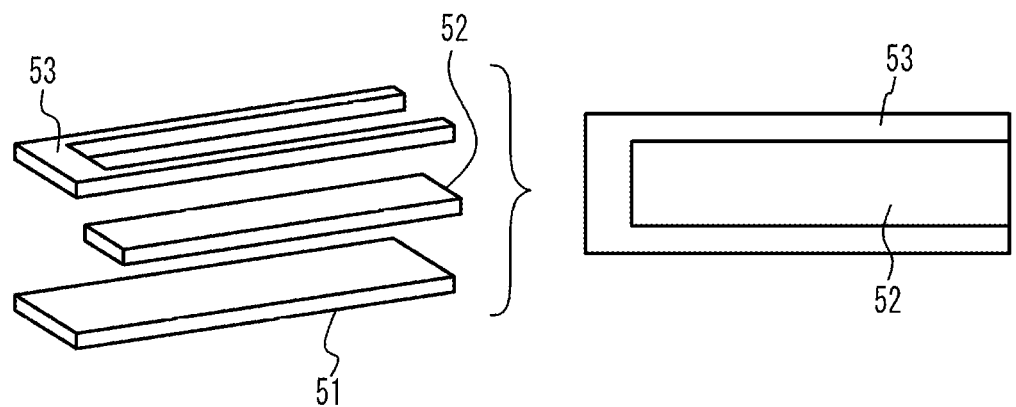
FIG. 6A and FIG. 6B illustrate a stacking process.

Next, as illustrated in FIG. 6A, a first pattern 52 for the internal electrode layer is formed on the surface of the dielectric green sheet 51 by printing a metal conductive paste with use of screen printing or gravure printing. The metal conductive paste contains an organic binder and metal particles for forming the internal electrode. Ceramic particles are added as a co-material to the metal conductive paste. The main component of the ceramic particles is not particularly limited, but is preferably the same as the main component ceramic of the dielectric layer 11.

As illustrated in FIG. 6A, a second pattern 53 is formed by printing an inverse pattern paste in the region where no first pattern 52 is printed on the dielectric green sheet 51 to cause the second pattern 53 and the first pattern 52 to form a flat surface. The inverse pattern paste contains, for example, the same component as the dielectric green sheet 51, and has a Sn concentration that is high with respect to the main component ceramic.

Figure 6B:
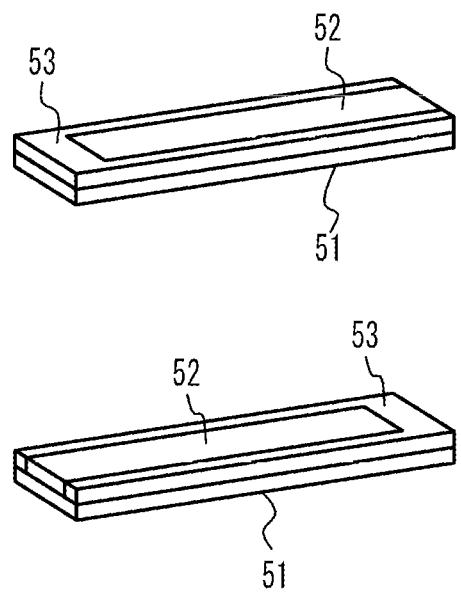

Thereafter, as illustrated in FIG. 6B, the dielectric green sheets 51, the first patterns 52, and the second patterns 53 are stacked so that the internal electrode layers 12 and the dielectric layers 11 are alternated with each other and the end edges of the internal electrode layers 12 are alternately exposed to both edge faces in the length direction of the dielectric layer 11 so as to be alternately led out to a pair of external electrodes 20a and 20b of different polarizations. For example, 100 to 500 dielectric green sheets 51 are stacked.

Figure 7:
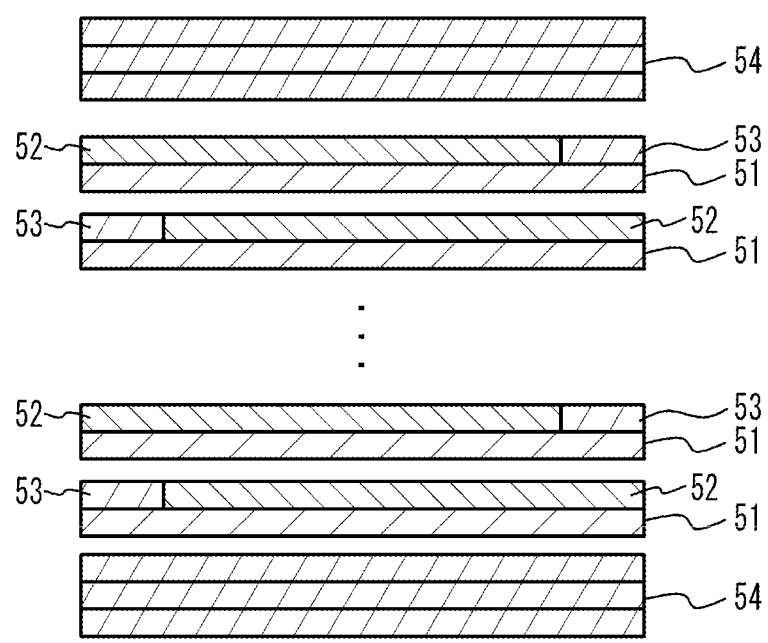
FIG. 7 illustrates the stacking process.

Next, as illustrated in FIG. 7, a predetermined number (for example, 2 to 10) of cover sheets 54 are stacked on and under the stacked dielectric green sheets 51, and then heated and compressed. The resulting multilayer structure is cut into a predetermined chip size (for example, 1.0 mm×0.5 mm). The cover sheet 54 contains, for example, the same component as the dielectric green sheet 51, and has a Sn concentration that is high with respect to the main component ceramic. Thereafter, metal conductive pastes to be the external electrodes 20a and 20b are respectively applied to the both edge faces of the multilayer structure, which has been cut, by dipping, and then dried. Through this process, a ceramic multilayer structure is obtained. Note that a predetermined number of the cover sheets 54 may be stacked and compressed, and then the stacked cover sheets 54 may be attached on and under the stacked dielectric green sheets 51.

Figure 8:
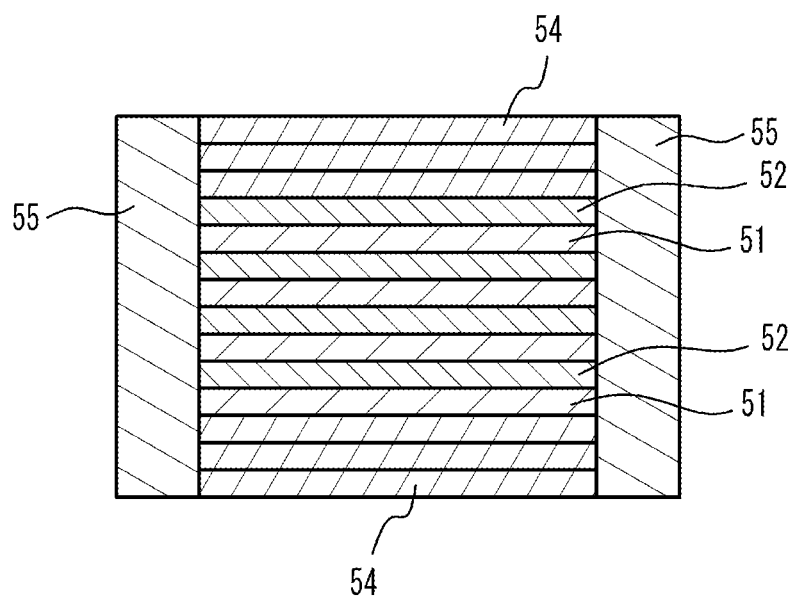
FIG. 8 illustrates the stacking process.

A portion in which the second patterns 53 are stacked may be attached after stacking. Specifically, as illustrated in FIG. 8, the dielectric green sheets 51 and the first patterns 52 having the same width as the dielectric green sheet 51 are alternately stacked to obtain a stack portion. Then, side margin sheets 55 are respectively attached to the side faces of the stack portion. A side margin paste for forming the side margin sheet 55 contains, for example, the same component as the dielectric green sheet 51, and has a Sn concentration that is high with respect to the main component ceramic.

Firing

A binder is removed from the resulting ceramic multilayer structure in a nitrogen ($N_2$) atmosphere, and then a metal paste to be the base for the external electrodes 20a and 20b is applied by dipping, and then fired in a reductive atmosphere with an oxygen partial pressure of $10^{-5}$ to $10^{-8}$ atm in a temperature range of 1100° C. to 1300° C. for 10 minutes to 2 hours. The above steps complete the multilayer ceramic capacitor 100.

Re-oxidizing

Thereafter, the re-oxidizing process may be performed in a $N_2$ gas atmosphere in a temperature range of 600° C. to 1000° C.

Plating

Thereafter, the external electrodes 20a and 20b may be coated with a metal such as Cu, Ni, or Sn by plating.

The base for the external electrodes 20a and 20b may be formed by baking after the firing.

In the manufacturing method in accordance with the present embodiment, the Sn concentration in the second pattern 53 is higher than the Sn concentration in the dielectric green sheet 51. Thus, after firing, the Sn concentrations in the side margin 16 and the end margin 15 become higher than the Sn concentration in the capacity section 14. Additionally, the Sn concentration in the cover sheet 54 is higher than the Sn concentration in the dielectric green sheet 51. Thus, after firing, the Sn concentration in the cover layer 13 becomes higher than the Sn concentration in the capacity section 14. This causes Sn to diffuse into the capacity section 14, and thereby the Sn concentration in the vicinity of the outer periphery of the capacity section 14 becomes higher, and the insulation property in the vicinity of the outer periphery of the capacity section 14 is improved. Since the IR degradation and the lifetime deterioration are likely to occur in the vicinity of the outer periphery of the capacity section 14. Thus, the effect to improve the insulation property can be effectively obtained. On the other hand, the Sn concentration in the center section of the capacity section 14 becomes low, and thereby, decrease in the continuousness of the internal electrode layer 12 in the center section of the capacity section 14 is reduced. Therefore, decrease in electrostatic capacitance can be reduced. Thus, high insulation property and high electrostatic capacitance are both achieved.

In the above embodiment, the multilayer ceramic capacitor has been described as an example of the ceramic electronic component, but this does not intend to suggest any limitation. For example, the ceramic electronic component may be other electronic components such as a varistor and a thermistor.

EXAMPLES

Hereinafter, the multilayer ceramic capacitors in accordance with the embodiment were fabricated, and the characteristics thereof were examined.

Example 1

Additives were added to barium titanate powder and were sufficiently wet-blended and crushed in a ball mill to obtain a dielectric material. An organic binder and solvents were added to the dielectric material, and the dielectric green sheet 51 was made by applying the resulting slurry on a PET base material using a doctor blade method. The organic binder was a butyral-based binder. The solvents were toluene and ethyl alcohol.

A metal conductive paste containing Ni metal powder, a binder, solvents, and other auxiliary agents as necessary was made. The organic binder and the solvents of the metal conductive paste were different from those of the dielectric green sheet 51. The first pattern 52 of the metal conductive paste was screen printed on the dielectric green sheet 51.

Then, 500 dielectric green sheets 51 on which the respective first patterns 52 were printed were stacked, and then the cover sheets 54 were staked on and under the stacked dielectric green sheets 51. The resulting multilayer structure was heated and compressed to obtain the ceramic multilayer structure, and then, the ceramic multilayer structure was cut into a predetermined shape (1005 shape). The side margin sheets 55 were attached to the respective side faces of the resulting ceramic multilayer structure. After a binder was removed in a $N_2$ atmosphere, a metal past to be the base for the external electrode was applied by dipping, and fired under a reductive atmosphere.

In the side margin sheet 55 before firing, the additive amount of Sn to Ti was adjusted to be 1.0 at %. In the cover sheet 54, the additive amount of Sn to Ti was adjusted to be 0.0 at %. In the dielectric green sheet 51, the additive amount of Sn to Ti was adjusted to be 0.0 at %.

After firing, in the side margin 16, the atomic concentration ratio of Sn to Ti was 0.007. In the cover layer 13, the atomic concentration ratio of Sn to Ti was 0.000. In the capacity section 14, the atomic concentration ratio of Sn to Ti was 0.000. For each section, the atomic concentration ratio of Sn to Ti was measured as follows. The center part of the chip was cut using a slicer, and was polished so that the cross-section of the center part of the chip became a clean cross-section using an ion milling device. In the cross-section of the resulting chip, a laser ablation ICP mass spectrography of the target section was performed to determine the quantity of each element. The spot diameter of the heating laser was 5 μm.

Example 2

In the example 2, the additive amount of Sn to Ti in the side margin sheet 55 before firing was adjusted to be 2.0 at %. In the cover sheet 54, the additive amount of Sn to Ti was adjusted to be 0.0 at %. In the dielectric green sheet 51, the additive amount of Sn to Ti was adjusted to be 0.0 at %.

After firing, in the side margin 16, the atomic concentration ratio of Sn to Ti was 0.017. In the cover layer 13, the atomic concentration ratio of Sn to Ti was 0.000. In the capacity section 14, the atomic concentration ratio of Sn to Ti was 0.001.

Example 3

In the example 3, in the side margin sheet 55 before firing, the additive amount of Sn to Ti was adjusted to be 3.0 at %. In the cover sheet 54, the additive amount of Sn to Ti was adjusted to be 0.0 at %. In the dielectric green sheet 51, the additive amount of Sn to Ti was adjusted to be 0.0 at %.

After firing, in the side margin 16, the atomic concentration ratio of Sn to Ti was 0.026. In the cover layer 13, the atomic concentration ratio of Sn to Ti was 0.000. In the capacity section 14, the atomic concentration ratio of Sn to Ti was 0.001.

Example 4

In the example 4, in the side margin sheet 55 before firing, the additive amount of Sn to Ti was adjusted to be 0.0 at %. In the cover sheet 54, the additive amount of Sn to Ti was adjusted to be 1.0 at %. In the dielectric green sheet 51, the additive amount of Sn to Ti was adjusted to be 0.0 at %.

After firing, in the side margin 16, the atomic concentration ratio of Sn to Ti was 0.000. In the cover layer 13, the atomic concentration ratio of Sn to Ti was 0.009. In the capacity section 14, the atomic concentration ratio of Sn to Ti was 0.000.

Example 5

In the example 5, in the side margin sheet 55 before firing, the additive amount of Sn to Ti was adjusted to be 1.0 at %. In the cover sheet 54, the additive amount of Sn to Ti was adjusted to be 1.0 at %. In the dielectric green sheet 51, the additive amount of Sn to Ti was adjusted to be 0.0 at %.

After firing, in the side margin 16, the atomic concentration ratio of Sn to Ti was 0.008. In the cover layer 13, the atomic concentration ratio of Sn to Ti was 0.009. In the capacity section 14, the atomic concentration ratio of Sn to Ti was 0.001.

Example 6

In the example 6, in the side margin sheet 55 before firing, the additive amount of Sn to Ti was adjusted to be 2.0 at %. In the cover sheet 54, the additive amount of Sn to Ti was adjusted to be 1.0 at %. In the dielectric green sheet 51, the additive amount of Sn to Ti was adjusted to be 0.0 at %.

After firing, in the side margin 16, the atomic concentration ratio of Sn to Ti was 0.017. In the cover layer 13, the atomic concentration ratio of Sn to Ti was 0.009. In the capacity section 14, the atomic concentration ratio of Sn to Ti was 0.001.

Example 7

In the example 7, in the side margin sheet 55 before firing, the additive amount of Sn to Ti was adjusted to be 3.0 at %. In the cover sheet 54, the additive amount of Sn to Ti was adjusted to be 1.0 at %. In the dielectric green sheet 51, the additive amount of Sn to Ti was adjusted to be 0.0 at %.

After firing, in the side margin 16, the atomic concentration ratio of Sn to Ti was 0.027. In the cover layer 13, the atomic concentration ratio of Sn to Ti was 0.009. In the capacity section 14, the atomic concentration ratio of Sn to Ti was 0.002.

Example 8

In the example 8, in the side margin sheet 55 before firing, the additive amount of Sn to Ti was adjusted to be 0.0 at %. In the cover sheet 54, the additive amount of Sn to Ti was adjusted to be 2.0 at %. In the dielectric green sheet 51, the additive amount of Sn to Ti was adjusted to be 0.0 at %.

After firing, in the side margin 16, the atomic concentration ratio of Sn to Ti was 0.000. In the cover layer 13, the atomic concentration ratio of Sn to Ti was 0.018. In the capacity section 14, the atomic concentration ratio of Sn to Ti was 0.001.

Example 9

In the example 9, in the side margin sheet 55 before firing, the additive amount of Sn to Ti was adjusted to be 1.0 at %. In the cover sheet 54, the additive amount of Sn to Ti was adjusted to be 2.0 at %. In the dielectric green sheet 51, the additive amount of Sn to Ti was adjusted to be 0.0 at %.

After firing, in the side margin 16, the atomic concentration ratio of Sn to Ti was 0.007. In the cover layer 13, the atomic concentration ratio of Sn to Ti was 0.018. In the capacity section 14, the atomic concentration ratio of Sn to Ti was 0.001.

Example 10

In the example 10, in the side margin sheet 55 before firing, the additive amount of Sn to Ti was adjusted to be 2.0 at %. In the cover sheet 54, the additive amount of Sn to Ti was adjusted to be 2.0 at %. In the dielectric green sheet 51, the additive amount of Sn to Ti was adjusted to be 0.0 at %.

After firing, in the side margin 16, the atomic concentration ratio of Sn to Ti was 0.018. In the cover layer 13, the atomic concentration ratio of Sn to Ti was 0.018. In the capacity section 14, the atomic concentration ratio of Sn to Ti was 0.002.

Example 11

In the example 11, in the side margin sheet 55 before firing, the additive amount of Sn to Ti was adjusted to be 3.0 at %. In the cover sheet 54, the additive amount of Sn to Ti was adjusted to be 2.0 at %. In the dielectric green sheet 51, the additive amount of Sn to Ti was adjusted to be 0.0 at %.

After firing, in the side margin 16, the atomic concentration ratio of Sn to Ti was 0.026. In the cover layer 13, the atomic concentration ratio of Sn to Ti was 0.018. In the capacity section 14, the atomic concentration ratio of Sn to Ti was 0.002.

Example 12

In the example 12, in the side margin sheet 55 before firing, the additive amount of Sn to Ti was adjusted to be 0.0 at %. In the cover sheet 54, the additive amount of Sn to Ti was adjusted to be 3.0 at %. In the dielectric green sheet 51, the additive amount of Sn to Ti was adjusted to be 0.0 at %.

After firing, in the side margin 16, the atomic concentration ratio of Sn to Ti was 0.000. In the cover layer 13, the atomic concentration ratio of Sn to Ti was 0.027. In the capacity section 14, the atomic concentration ratio of Sn to Ti was 0.001.

Example 13

In the example 13, in the side margin sheet 55 before firing, the additive amount of Sn to Ti was adjusted to be 1.0 at %. In the cover sheet 54, the additive amount of Sn to Ti was adjusted to be 3.0 at %. In the dielectric green sheet 51, the additive amount of Sn to Ti was adjusted to be 0.0 at %.

After firing, in the side margin 16, the atomic concentration ratio of Sn to Ti was 0.008. In the cover layer 13, the atomic concentration ratio of Sn to Ti was 0.027. In the capacity section 14, the atomic concentration ratio of Sn to Ti was 0.002.

Example 14

In the example 14, in the side margin sheet 55 before firing, the additive amount of Sn to Ti was adjusted to be 2.0 at %. In the cover sheet 54, the additive amount of Sn to Ti was adjusted to be 3.0 at %. In the dielectric green sheet 51, the additive amount of Sn to Ti was adjusted to be 0.0 at %.

After firing, in the side margin 16, the atomic concentration ratio of Sn to Ti was 0.018. In the cover layer 13, the atomic concentration ratio of Sn to Ti was 0.027. In the capacity section 14, the atomic concentration ratio of Sn to Ti was 0.002.

Example 15

In the example 15, in the side margin sheet 55 before firing, the additive amount of Sn to Ti was adjusted to be 3.0 at %. In the cover sheet 54, the additive amount of Sn to Ti was adjusted to be 3.0 at %. In the dielectric green sheet 51, the additive amount of Sn to Ti was adjusted to be 0.0 at %.

After firing, in the side margin 16, the atomic concentration ratio of Sn to Ti was 0.027. In the cover layer 13, the atomic concentration ratio of Sn to Ti was 0.027. In the capacity section 14, the atomic concentration ratio of Sn to Ti was 0.003.

Example 16

In the example 16, in the side margin sheet 55 before firing, the additive amount of Sn to Ti was adjusted to be 2.0 at %. In the cover sheet 54, the additive amount of Sn to Ti was adjusted to be 2.0 at %. In the dielectric green sheet 51, the additive amount of Sn to Ti was adjusted to be 1.0 at %.

After firing, in the side margin 16, the atomic concentration ratio of Sn to Ti was 0.020. In the cover layer 13, the atomic concentration ratio of Sn to Ti was 0.019. In the capacity section 14, the atomic concentration ratio of Sn to Ti was 0.011.

Example 17

In the example 17, in the side margin sheet 55 before firing, the additive amount of Sn to Ti was adjusted to be 2.0 at %. In the cover sheet 54, the additive amount of Sn to Ti was adjusted to be 2.0 at %. In the dielectric green sheet 51, the additive amount of Sn to Ti was adjusted to be 2.0 at %.

After firing, in the side margin 16, the atomic concentration ratio of Sn to Ti was 0.021. In the cover layer 13, the atomic concentration ratio of Sn to Ti was 0.019. In the capacity section 14, the atomic concentration ratio of Sn to Ti was 0.020.

[Comparative Example]

In the comparative example, in the side margin sheet 55 before firing, the additive amount of Sn to Ti was adjusted to be 0.0 at %. In the cover sheet 54, the additive amount of Sn to Ti was adjusted to be 0.0 at %. In the dielectric green sheet 51, the additive amount of Sn to Ti was adjusted to be 0.0 at %. That is, no Sn was added.

After firing, in the side margin 16, the atomic concentration ratio of Sn to Ti was 0.000. In the cover layer 13, the atomic concentration ratio of Sn to Ti was 0.000. In the capacity section 14, the atomic concentration ratio of Sn to Ti was 0.000.

For the examples 1 to 17 and the comparative example, the lifetime (50% value) was measured. The DC of 12V was applied in a thermostatic chamber at 120° C., and the time when the current value exceeded 10 mA was measured as the lifetime of each chip. For each example, 100 chips were measured.

The IR defect rate was measured for 100 samples of each of the examples 1 to 17 and the comparative example. The direct-current resistance value was measured using a tester, and the sample of which the direct-current resistance value was below 1 MΩ at room temperature was determined to be rejectable.

For each of the examples 1 to 17 and the comparative example, the electrostatic capacitance was measured. The electrostatic capacitance was measured as follows. The chip was kept at 150° C. (the temperature above the Curie point of the dielectric substance) for one hour, and then brought back to room temperature. After 24 hours from when the chip was brought back to room temperature, the electrostatic capacitance was measured. The electrostatic capacitance was measured at 120 Hz and 0.5 Vrms using an LCR meter.

Tables 1 and 2 list the measurement results. As presented in Tables 1 and 2, in the comparative example, the IR defect rate was high, 14%. This is considered because Sn did not diffuse into the outer peripheral section of the capacity section 14 because Sn was added to neither the side margin 16 nor the cover layer 13, and Ni, which was the main component metal of the internal electrode layer 12, formed a solid solution with the dielectric layer 11, and the insulation property thereby decreased.

By contrast, in all the examples 1 to 3, the IR defect rate was improved. This is considered because the Sn concentration in the side margin 16 was higher than the Sn concentration in the capacity section 14, and thereby, Sn diffused into the outer peripheral section of the capacity section 14. In the examples 1 to 3, the electrostatic capacitance little decreased. This is considered because the Sn concentration in the capacity section 14 was low.

In the example 4, the IR defect rate was improved compared with in the comparative example. This is considered because the Sn concentration in the cover layer 13 was higher than the Sn concentration in the capacity section 14, and therefore, Sn diffused into the outer peripheral section of the capacity section 14. In the example 4, the electrostatic capacitance did not decrease compared with in the comparative example. This is considered because the Sn concentration in the capacity section 14 was low.

The IR defect rates in the examples 5 to 7 were lower than those in the examples 1 to 3, respectively. This is considered because the Sn concentration in the side margin 16 and the Sn concentration in the cover layer 13 were both higher than the Sn concentration in the capacity section 14, and therefore, Sn diffused into the outer peripheral section of the capacity section 14. In the examples 5 to 7, the electrostatic capacitance little decreased. This is considered because the Sn concentration in the capacity section 14 was low.

The IR defect rates in the examples 8 to 11 were lower than those in the examples 4 to 7, respectively. This is considered because the Sn concentration in the side margin 16 in each of the examples 8 to 11 was even higher than that in the corresponding one of the examples 4 to 7. In the examples 8 to 11, the electrostatic capacitance little decreased. This is considered because the Sn concentration in the capacity section 14 was low.

The IR defect rates in the examples 12 to 15 were lower than those in the examples 8 to 11, respectively. This is considered because the Sn concentration in the side margin 16 in each of the examples 12 to 15 was even higher than that in the corresponding one of the examples 8 to 11. In the examples 12 to 15, the electrostatic capacitance little decreased. This is considered because the Sn concentration in the capacity section 14 was low.

In the example 16, the IR defect rate was even lower than that in the example 10. This is considered because Sn was also added to the capacity section 14, and the insulation property was thereby further improved. However, the electrostatic capacitance in the example 16 was lower than that in the example 10. This is considered because the Sn concentration in the capacity section 14 was higher than that in the example 10.

TABLE 1

| | Side margin Sn additive amount | Cover sheet Sn additive amount | Capacity section Sn additive amount | Lifetime 50% value |
|---|---|---|---|---|
| Comparative Example | 0.0 at % | 0.0 at % | 0.0 at % | 280 min |
| Example 1 | 1.0 at % | 0.0 at % | 0.0 at % | 325 min |
| Example 2 | 2.0 at % | 0.0 at % | 0.0 at % | 338 min |
| Example 3 | 3.0 at % | 0.0 at % | 0.0 at % | 335 min |
| Example 4 | 0.0 at % | 1.0 at % | 0.0 at % | 303 min |
| Example 5 | 1.0 at % | 1.0 at % | 0.0 at % | 333 min |
| Example 6 | 2.0 at % | 1.0 at % | 0.0 at % | 341 min |
| Example 7 | 3.0 at % | 1.0 at % | 0.0 at % | 338 min |
| Example 8 | 0.0 at % | 2.0 at % | 0.0 at % | 305 min |
| Example 9 | 1.0 at % | 2.0 at % | 0.0 at % | 335 min |
| Example 10 | 2.0 at % | 2.0 at % | 0.0 at % | 344 min |
| Example 11 | 3.0 at % | 2.0 at % | 0.0 at % | 337 min |
| Example 12 | 0.0 at % | 3.0 at % | 0.0 at % | 307 min |
| Example 13 | 1.0 at % | 3.0 at % | 0.0 at % | 332 min |
| Example 14 | 2.0 at % | 3.0 at % | 0.0 at % | 336 min |
| Example 15 | 3.0 at % | 3.0 at % | 0.0 at % | 328 min |
| Example 16 | 2.0 at % | 2.0 at % | 1.0 at % | 338 min |

TABLE 2

| | IR defect rate n = 100 | Electrostatic capacitance | Side margin Sn/Ti | Cover layer Sn/Ti | Center section Sn/Ti |
|---|---|---|---|---|---|
| Comparative Example | 14% | 20.6 μF | 0.000 | 0.000 | 0.000 |
| Example 1 | 7% | 20.6 μF | 0.007 | 0.000 | 0.000 |
| Example 2 | 4% | 20.4 μF | 0.017 | 0.000 | 0.001 |
| Example 3 | 3% | 20.3 μF | 0.026 | 0.000 | 0.001 |
| Example 4 | 12% | 20.6 μF | 0.000 | 0.009 | 0.000 |
| Example 5 | 5% | 20.5 μF | 0.008 | 0.009 | 0.001 |
| Example 6 | 3% | 20.4 μF | 0.017 | 0.009 | 0.001 |
| Example 7 | 3% | 20.3 μF | 0.027 | 0.009 | 0.002 |
| Example 8 | 11% | 20.5 μF | 0.000 | 0.018 | 0.001 |
| Example 9 | 4% | 20.4 μF | 0.007 | 0.018 | 0.001 |
| Example 10 | 3% | 20.3 μF | 0.018 | 0.018 | 0.002 |
| Example 11 | 2% | 20.3 μF | 0.026 | 0.018 | 0.002 |
| Example 12 | 9% | 20.4 μF | 0.000 | 0.027 | 0.001 |
| Example 13 | 4% | 20.4 μF | 0.008 | 0.027 | 0.002 |
| Example 14 | 2% | 20.3 μF | 0.018 | 0.027 | 0.002 |
| Example 15 | 2% | 20.1 μF | 0.027 | 0.027 | 0.003 |
| Example 16 | 2% | 19.9 μF | 0.020 | 0.019 | 0.011 |

Although the embodiments of the present invention have been described in detail, it is to be understood that the various change, substitutions, and alterations could be made hereto without departing from the spirit and scope of the invention.

What is claimed is:

1. A ceramic electronic component comprising:
a multilayer structure having a substantially rectangular parallelepiped shape and including dielectric layers and internal electrode layers that are alternately stacked, the dielectric layers being mainly composed of ceramic, the internal electrode layers being formed so as to be alternately exposed to two edge faces opposite to each other of the multilayer structure; and
cover layers respectively disposed on a top face and a bottom face of the multilayer structure in a first direction in which the dielectric layers and the internal electrode layers are alternately stacked, the cover layers being mainly composed of ceramic,
wherein a Sn concentration with respect to a main component ceramic in the cover layer is higher than a Sn concentration with respect to a main component ceramic in a capacity section, a side margin section being a section that covers edges, extending toward a corresponding side face of two side faces other than the two edge faces of the multilayer structure, of the internal electrode layers, the capacity section being a section where a set of the internal electrode layers exposed to one of the two edge faces is opposite to another set of the internal electrode layers exposed to the other of the two edge faces,
wherein the main component ceramic of each cover layer has a perovskite structure, and
wherein an atomic concentration ratio of Sn to B site elements in each cover layer is 0.005 or greater and 0.1 or less.

2. The ceramic electronic component according to claim 1,
wherein the main component ceramic of the capacity section and a main component ceramic of the side margin section also have perovskite structures,
wherein at least one of the atomic concentration ratio of Sn to B site elements in each cover layer or the atomic concentration ratio of Sn to B site elements in the side margin section is higher than the atomic concentration ratio of Sn to B site elements in the capacity section by 0.001 or greater.

3. The ceramic electronic component according to claim 2,
wherein at least one of the atomic concentration ratio of Sn to B site elements in each cover layer or the atomic concentration ratio of Sn to B site elements in the side margin section is higher than the atomic concentration ratio of Sn to B site elements in the capacity section by 0.001 or greater and 0.1 or less.

4. The ceramic electronic component according to claim 1,
wherein a main component ceramic of the side margin section has a perovskite structure,
wherein an atomic concentration ratio of Sn to B site elements in the side margin section is 0.01 or greater.

5. The ceramic electronic component according to claim 1,
wherein the main component ceramic of the capacity section has a perovskite structure,
wherein an atomic concentration ratio of Sn to B site elements in the capacity section is 0.005 or less.

6. The ceramic electronic component according to claim 1,
wherein a Sn concentration with respect to a main component ceramic in an end margin section is higher than the Sn concentration with respect to the main component ceramic in the capacity section, the end margin section being a section where the internal electrode layers exposed to one of the edge faces are opposite to each other with no internal electrode layers exposed to the other of the edge faces interposed therebetween in the multilayer structure.

7. The ceramic electronic component according to claim 1,
wherein the main component ceramic of the dielectric layer is barium titanate,
wherein a main component metal of the internal electrode layer is nickel.

8. A manufacturing method of a ceramic electronic component, the manufacturing method comprising:
preparing a ceramic multilayer structure including a multilayer portion, side margin sheets disposed on respective side faces of the multilayer portion, and cover sheets respectively disposed on top and bottom faces of the multilayer portion, the multilayer portion including dielectric green sheets and patterns that are alternately stacked so that the patterns are alternately exposed to two edge faces opposite to each other of the multilayer portion, the dielectric green sheets containing ceramic particles, the patterns containing metal particles, the side margin sheets containing ceramic particles, the cover sheets containing ceramic particles, wherein a Sn concentration with respect to a main component ceramic in each cover sheet before being deposited is higher than a Sn concentration with respect to a main component ceramic in each dielectric green sheet; and
firing the ceramic multilayer structure.

9. A manufacturing method of a ceramic electronic component, the manufacturing method comprising:
disposing a first pattern containing metal particles on a dielectric green sheet containing ceramic particles and disposing a second pattern containing ceramic particles in a periphery of the first pattern to obtain a multilayer unit; and
obtaining a ceramic multilayer structure in which cover sheets containing ceramic particles are respectively stacked on top and bottom faces of a multilayer portion in which a plurality of the multilayer units is stacked so that positions of the first patterns are alternately shifted,
at least one of a Sn concentration with respect to a main component ceramic in each cover sheet or a Sn concentration with respect to a main component ceramic in the second pattern, before being stacked, is higher than a Sn concentration with respect to a main component ceramic in each dielectric green sheet; and
firing the ceramic multilayer structure.

\* \* \* \* \*

UNITED STATES PATENT AND TRADEMARK OFFICE
CERTIFICATE OF CORRECTION

| | | |
|---|---|---|
| PATENT NO. | : 12,211,651 B2 | Page 1 of 1 |
| APPLICATION NO. | : 17/691887 | |
| DATED | : January 28, 2025 | |
| INVENTOR(S) | : Yoichi Kato | |

It is certified that error appears in the above-identified patent and that said Letters Patent is hereby corrected as shown below:

In the Claims

At Column 16, Line 66, in Claim 2, "the" after "or" should be "an".

At Column 17, Line 1, in Claim 2, "the" after "than" should be "an".

Signed and Sealed this
First Day of April, 2025

Coke Morgan Stewart
*Acting Director of the United States Patent and Trademark Office*